(12) United States Patent
Dokey et al.

(10) Patent No.: US 8,959,633 B1
(45) Date of Patent: Feb. 17, 2015

(54) DETECTING ANOMALOUS BEHAVIOR PATTERNS IN AN ELECTRONIC ENVIRONMENT

(71) Applicant: Amazon Technologies, Inc., Reno, NV (US)

(72) Inventors: Aaron Douglas Dokey, Seattle, WA (US); Ian Roger Searle, Bellevue, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 146 days.

(21) Appl. No.: 13/828,265

(22) Filed: Mar. 14, 2013

(51) Int. Cl.
*G06F 21/32* (2013.01)
*G06F 21/50* (2013.01)

(52) U.S. Cl.
CPC ...................................... *G06F 21/50* (2013.01)
USPC ............ 726/22; 726/1; 726/2; 726/7; 726/25; 709/224; 705/30; 705/38; 705/39; 705/41

(58) Field of Classification Search
USPC .................... 726/1–7, 22–25; 705/30, 38–41; 709/224
See application file for complete search history.

(56) References Cited

U.S. PATENT DOCUMENTS

| | | | |
|---|---|---|---|
| 2005/0086166 A1* | 4/2005 | Monk et al. ...................... | 705/41 |
| 2007/0073630 A1* | 3/2007 | Greene et al. ................... | 705/80 |
| 2009/0018983 A1* | 1/2009 | El-Rafei et al. ................. | 706/12 |
| 2010/0094767 A1* | 4/2010 | Miltonberger ................ | 705/325 |
| 2010/0229230 A1* | 9/2010 | Edeki et al. ........................ | 726/7 |
| 2011/0296003 A1* | 12/2011 | McCann et al. .............. | 709/224 |

* cited by examiner

*Primary Examiner* — Venkat Perungavoor
*Assistant Examiner* — Amir Mehrmanesh
(74) *Attorney, Agent, or Firm* — Novak Druce Connolly Bove + Quigg LLP (57) ABSTRACT

The behavior of a group of resources, such as a fleet of servers, can be monitored to attempt to determine a baseline of acceptable behaviors. When a behavior is observed, the baseline can be consulted to determine whether the behavior is indicated to be acceptable. If not, the rate or extent at which the newly observed behavior is observed on groupings of similar resources can be monitored. This information can be used to determine whether the behavior is acceptable in which case information for the observed behavior can be used to automatically update the baseline such that the baseline is representative of current acceptable behavior within the group of resources.

22 Claims, 6 Drawing Sheets

DETECTING ANOMALOUS BEHAVIOR PATTERNS IN AN ELECTRONIC ENVIRONMENT

BACKGROUND

As an increasing number of applications and services are being made available over networks such as the Internet, an increasing number of content, application, and service providers are turning to technologies such as resource sharing, multi-tenant environments, and cloud computing. Such technologies can enable a user to obtain access to electronic resources through services, such as Web services, where the hardware and/or software used to support those services is dynamically scalable to meet the needs of the services at any given time. A user or customer typically will rent, lease, or otherwise pay for access to these resources, and thus does not have to purchase and maintain the hardware and/or software to provide access to these resources.

In at least some environments, a provider of these resources can be responsible for tasks such as upgrading and deploying software, as well as managing configuration information for the various resources. Because outside entities are able to obtain access to those resources, however, it is possible that a user, device, or application might attempt to update information, deploy code, modify settings, or perform other unauthorized activities with respect to the various resources. Oftentimes it is difficult to detect such activity, or at least detect such activity before the changes can be spread to a significant portion of the resource environment.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to detecting suspicious activity or unexpected actions in an electronic environment. In particular, various embodiments attempt to establish a baseline of expected or "acceptable" behaviors in a specific environment, and then compare observed behaviors to the baseline to attempt to recognize unexpected or suspicious behaviors. The baseline can be automatically updated based on information such as the rate or prevalence of observation of behaviors across a large homogeneous collection of similar resources, for example. If a behavior is observed to occur at a rate, or with a prevalence, that is consistent with a determined or specified rate or prevalence, as may be set by a provider, then information for that behavior can be used to update the baseline. If the observed behavior occurs at a rate, or with a prevalence, that is inconsistent with the specified rate or prevalence, then that behavior can be considered anomalous and potentially suspicious, and can be handled as such.

Various other applications, processes and uses are presented below with respect to the various embodiments.

Figure 1:
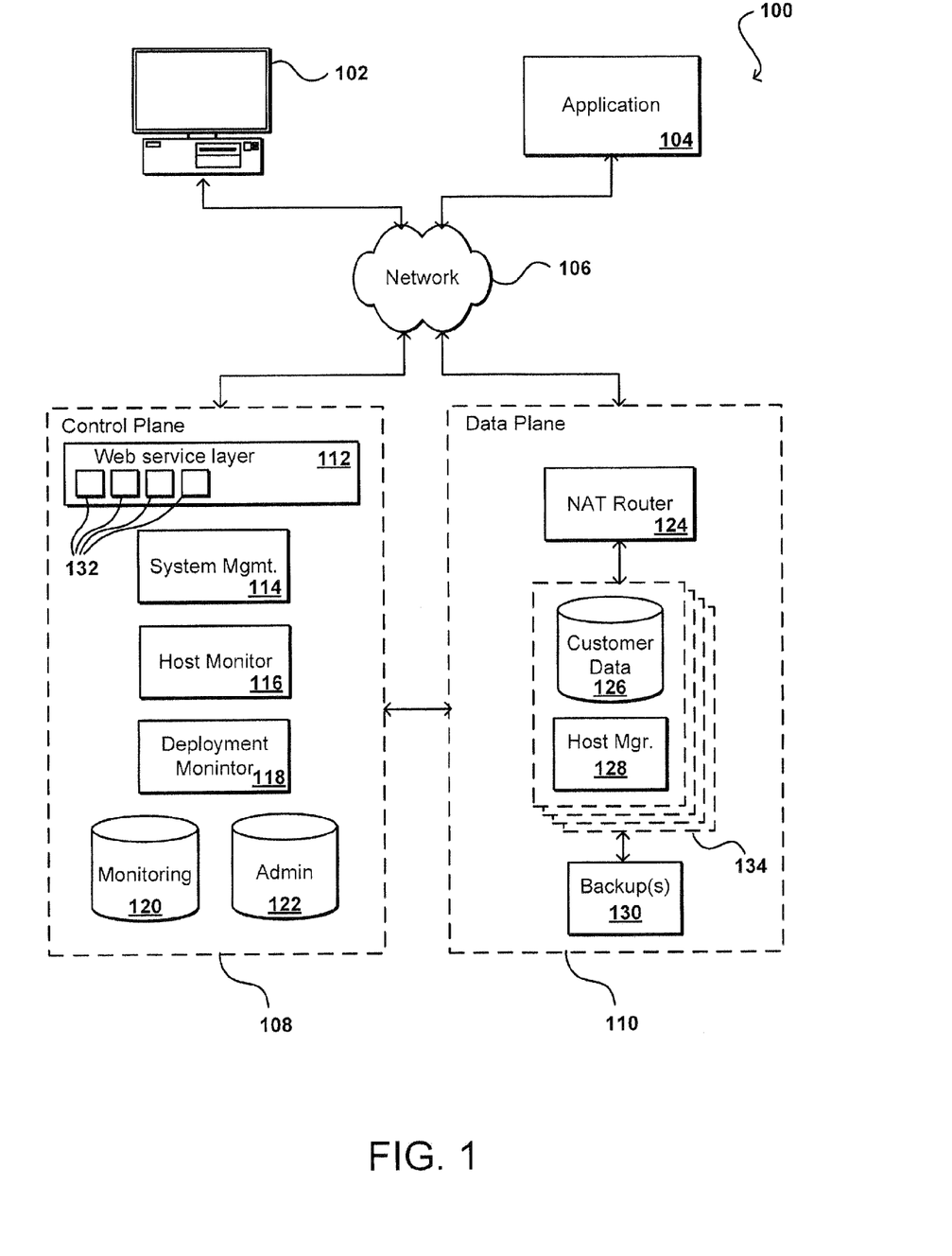
FIG. 1 illustrates an environment in which various embodiments can be implemented.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

The control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 110 through the network using a Java Database Connectivity (JDBC) or other such client to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

Figure 2:
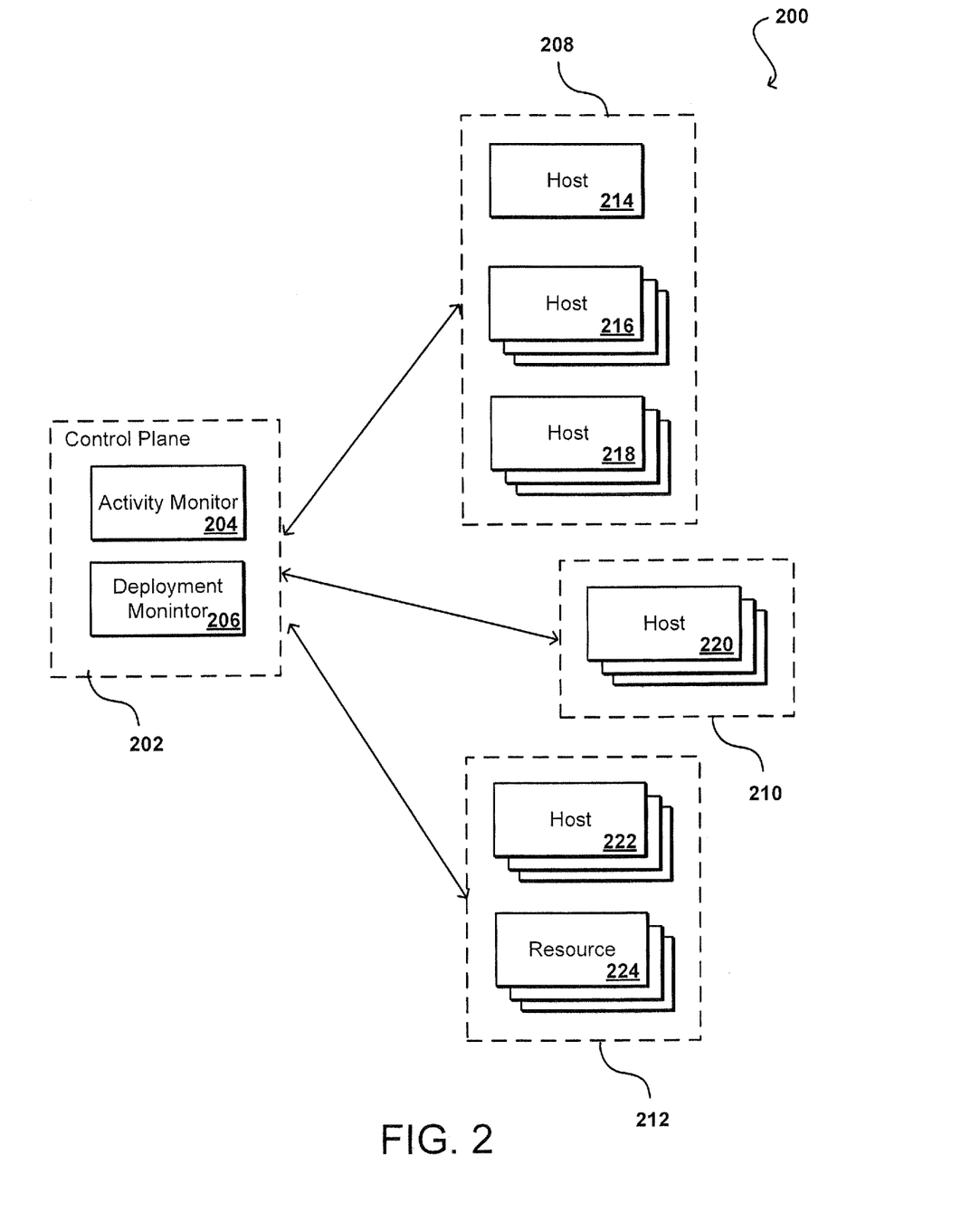
FIG. 2 illustrates an example situation in which various behaviors can be monitored in accordance with various embodiments.

FIG. 2 illustrates a view 200 of a portion of an environment such as that illustrated in FIG. 1. In this example, there are multiple groups of hosts or other such resources, where at least some of those groups can be separated logically and/or geographically. For example, one group 208 of hosts can correspond to a data center located in a first location, while other groups 210, 212 correspond to hosts located in other regions or areas. Within a given group 208, there can be hosts of different types 214, 216, 218 that can communicate with each other in at least some situations or under certain conditions. A "type" of host might correspond to a physical type or configuration, or can correspond to an intended use or allocation of a host machine, among other such options. In some embodiments, hosts of one group 208 might communicate with hosts of at least one other group 210, 212 for specific purposes and/or at specific times. Further, configuration or software updates or deployments might be made across groups, one group at a time, or at another determined rate.

As illustrated, one or more activity monitors 204 and/or deployment monitors 206 in a control plane 202 environment can be configured to monitor behavior of the various hosts and/or groups. This behavior can include behavior within a given group and/or across two or more groups. The behavior can include any monitorable behavior that can occur within such a networked, multi-tenant, and/or shared resource environment. This can include, for example, configuration changes, deployments, communications, network flow, and the like. One or more monitoring components can be configured to monitor behavior information and attempt to establish a "baseline" for the current state of the resource environment and/or data plane. As used herein, a "baseline" generally refers to a model, set, or other grouping or collection of information for identifying expected, normal, or "acceptable" behavior for the environment as it currently exists, at least within a reasonable tolerance for data collection, analysis, and variance, etc.

For example, a baseline can include information about configurations of hosts across a network, or software packages deployed on those hosts. Similarly, the baseline can include information about types of connections between those hosts and/or other resource in a resource environment, which can also include which types of hosts are associated with which types of connections. When a behavior is observed that is in line with the expected behaviors, the information for that behavior can be added to, or otherwise used to update, the baseline. In order to determine whether a behavior is acceptable or not, with respect to the baseline, the behavior can be monitored for a period of time across the resource environment to determine aspects such as a rate of change or deployment, a prevalence of the behavior, or other such factors. The rate, prevalence, or other such factors then can be compared against current baseline parameters to determine whether the behavior is an acceptable behavior. The current baseline parameters can include information such as an average rate, or range of rates, at which software updates or deployments typically propagate across the environment, as observed over a recent period of time. For example, a deployment might start with a specified number of hosts, and gradually increase at a determined rate (or up to a maximum rate) until the majority of hosts have received the deployment, after which time the deployment rate will tail off. Information such as the maximum rate of deployment, the general pattern of the deployment, the prevalence of the deployment (i.e., what percentage or number of hosts received the deployment), or other such information can be gathered and used to provide information about what an acceptable deployment "should" look like when deployed by a provider of the environment. In at least some embodiments, the activity monitor can receive information from each host manager when the software for the respective host is updated, whereby the monitor can track the deployment. In another example, a deployment monitor can monitor the flow of traffic or establishment of connections among groups or hosts of groups for a particular action, and this information can be compiled to determine metrics for expected types of communication or amounts of traffic, rates at which groups of hosts connect to other groups, etc. Baselining can potentially take into account any telemetry information available for activity occurring in a specified electronic environment.

In FIG. 2, the activity monitor 204 in the control plane 202 might determine that a change in software version is being detected on hosts in one or more of the host groups 208, 210, 212. This change can be compared to the baseline to determine whether the behavior is an expected or "good" behavior as indicated in the baseline. If the baseline does not indicate that the behavior is acceptable, the behavior can be monitored to determine whether the behavior matches acceptable baseline behavior parameters, as may indicate that software updates for the environment are only deployed in one group at a time. If the deployment being monitored is noticed to occur in multiple groups, and thus falls outside the baseline parameter values, the behavior might be determined to be suspicious. Similarly, if the rate at which hosts are receiving the update is significantly outside the range of acceptable baseline parameters, the deployment monitor 206 or another such component might determine that the behavior is suspicious. The acceptability of deployments might be determined in other ways as well. For example, software deployed on one set of hosts 216 might communicate with a given host machine 214. If hosts from another set 218 start communicating with that host machine 214, it can be determined that an action is occurring (e.g., software is being deployed or configuration information updated) on the hosts of that set 218, and the rate at which the change is propagating can be determined and compared against the acceptable baseline parameters for rates of propagation. If those hosts 218 are of a type that would not normally talk to that host machine 214, that can also be indicative of suspicious behavior. Information for any outlier, or behavior sufficiently different from the baseline, can be analyzed to attempt to determine whether a remedial action should be taken, alarm generated, among other such options.

In at least some embodiments, information used to generate the baseline can be specific information captured in response to a user action, or information from observing the resources as a whole. For example, an authorized user might schedule a deployment of a specific software package (e.g., RPM or Windows cab file) or version upgrade. The user might also request that the deployment monitoring component monitor the deployment to attempt to determine how an authorized deployment will propagate through the system. In other embodiments, the deployment manager or another such component can monitor any change to the system and watch its propagation rate, or any of various other effects such as triggered communications, to attempt to determine a rate (e.g., velocity) or range of rates at which most deployments propagate. Such an approach enables outliers to be examined as either potentially being suspicious, or at least having an unusual deployment rate which might be of interest to examine for purposes of errors, unexpected actions, etc. In at least some embodiments, a minimum percentage or number of hosts must exhibit a particular behavior before that behavior is added and/or considered for the baseline as an "acceptable" behavior. For any detected change, a monitoring component might be configured to attempt to determine a velocity of propagation for the change across a fleet, for example, and then determine whether to alarm when the velocity falls outside a value or range specified in the most recently generated or updated baseline. If the velocity is within a range specified by the baseline and is present on a minimum percentage or portion of the fleet, the monitoring of that change can be terminated in at least some embodiments, although in other embodiments the information can continue to be monitored in order to update the baseline accordingly.

A baseline can also be used to assist with analyzing pervasiveness of various changes. For example, if each host in the fleet changes behavior at the same time, that might be less suspicious than if a single host changes behavior. Similarly, if only one group of hosts ever is designated to change at the same time, and multiple groups are detected to change behavior at the same time, that change might also be determined to be potentially suspicious. Such approaches can help to generate alarms for new, interesting behavior without generating a number of false positives in response to changes made to the environment.

A baseline can take any of a number of forms and can include a combination of a number of different types of information in various embodiments. For example, a baseline might take the form of a table or sheet of values, as may be stored in a central repository or distributed amongst various data stores. If deployment velocity is monitored then the baseline parameters for acceptable behaviors included in the baseline might include information such as rate of deployment, percentage of resources receiving the deployment, information about which or how many groups receive a deployment over a given period, etc. If communication or network flow is monitored, the baseline parameters might include information such as rates or numbers of packets transmitted, which connections are typical or expected between which groups of hosts, percentages of the fleet expected to communicate over a period of time, etc. Other information such as percentage of the fleet with a particular configuration or binary, software package, version, or other value can also be stored as well within the scope of the various embodiments. A baseline also can categorize specific behavior, which can be compared to monitored behavior to determine whether the velocity might be reasonable but the type of action is unexpected, etc.

An advantage to such an approach over conventional monitoring systems is that conventional monitoring systems require a user or system administrator to define values of expected or unexpected behavior, which then are used to determine when to alarm or take other action. By dynamically monitoring and updating a baseline for the system, the alarming can be based on actual behavior for the system, which can be updated as appropriate when groups or resources are added, removed, or altered, for example, each of which can potentially change the behavior of the system for various events. Such an approach reduces the likelihood of false positives, and improves the signal to noise ratio with respect to these conventional systems. Further, the monitoring can provide specific information about the outlier behavior, while conventional systems might indicate that there is a problem but do not provide much information that can be used to pinpoint or determine the nature of the problem. For example, an alarm can include information about the type of host being affected, the particular version of software being installed, and the types of communication being generated, among others. This information then can be provided to a correlation engine in at least some embodiments to provide more granular analysis and data about which types of communication are seen between which types of hosts, which packages are installed on which types of hosts, the configurations expected for various types of hosts, etc., which also enables the detection of more subtle behavior that still falls outside the baseline, such as a package being deployed at an expected rate but to hosts of an unexpected type or configuration for that type of package. In some embodiments, the baseline can include, or have access to, profiles for various types of resources, communications, or other aspects of the environment.

Such an approach also reduces the amount of friction experienced when a team attempts to perform a task, such as to roll out or deploy a package or upgrade. In conventional systems, the team might have to create a bunch of rules for the deployment and spend a lot of time describing the deployment so various alarms are not generated in response to the deployment. Such an approach can create a lot of additional work and potentially delay the deployment. By monitoring and automatically determining expected behavior, and updating that behavior as it changes, packages and changes can be deployed without all the upfront rule generation and description, reducing costs and simplifying the deployment process.

In at least some embodiments, however, a system administrator or other such user can have the ability to specify various parameters for the determination. For example, an administrator might be able to specify a percentage of the fleet that must receive a deployment before the deployment is determined to be purposeful. There also can be a minimum rate of deployment under which the deployment would not be considered to be purposeful. Various other such parameters can be specified as well within the scope of the various embodiments.

In some embodiments, a model might be used to generate and update the baseline. The model can accept input relating to observed behavior, then generate coefficients or values of expected behavior by processing that input with respect to the model. The model can include a number of heuristics, which can be expressed as a number of new hosts per day, percentage of fleet size that changes per day, or other information. At least some of these heuristics then can be automatically tuned based at least in part upon the observed behavior over a period of time. In other embodiments, machine learning can be used to analyze and identify patterns of behavior. A training set of data can be provided that includes parameters for expected behavior and unexpected behavior, for example, and the model can be updated as actual behavior data for the environment is obtained.

Referring again to FIG. 2, a team might bring a new host 214 online. In response, hosts 216 of a certain type might begin connecting to the new host 214. If the hosts 216 are of a type that is expected to connect to the new host 214, and the connections corresponds to "good" behaviors in the baseline or the rate of connections is within an expected velocity range according to the current baseline parameters, the behavior can be determined to be normal, expected, and/or purposeful. If, however, the new host 214 is being connected to by an unexpected group of hosts 218, or is receiving connections at an unexpected rate that falls outside the current baseline parameters, then that behavior can be determined to be suspicious. Further, if hosts 220, 222 of one or more other groups 210, 212 begin connecting to the new host 214, and the host is of a type that only connects within its group 208, then that behavior also can be flagged as suspicious. Similarly, if hosts 222 or other resources 224 in a particular group are observed to have a configuration or package that is only expected for a different group 210, then that behavior can be flagged as suspicious as well. In some cases, ports or types of communications are correlated with specific software packages or types of hosts, among other correlations that can be viewed as typical or expected behaviors.

Figure 3:
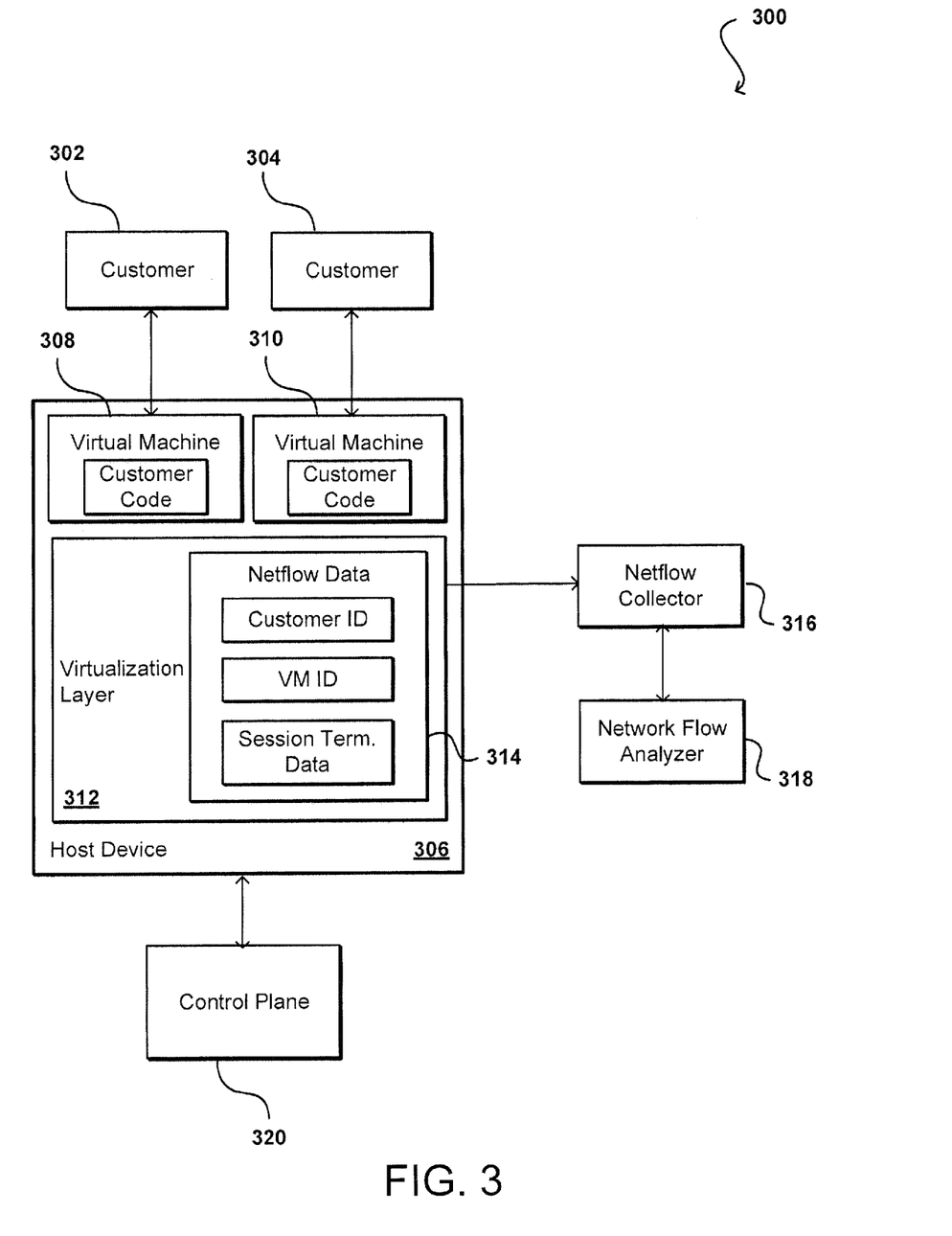
FIG. 3 illustrates an example configuration wherein network flow data can be monitored and compared to baseline activity in accordance with at least one embodiment.

FIG. 3 illustrates components of an example configuration 300 that can utilize baseline and monitoring approaches as discussed herein. In this example, a behavior that can be monitored includes the network flow within a fleet of devices or other such environment. Conventionally, network flow ("netflow") is a protocol for collecting internet protocol (IP) traffic information on a network. A network device 306, such as a router, host, or switch, gathers network flow data (netflow data) and exports the data to a netflow collector 316. The collected netflow data can be analyzed to detect various issues on the network, such as misconfigurations of various devices and the like. Netflow data can be organized as one or more records, where each record defines a flow. A flow can be a unidirectional sequence of packets that share certain common data values (e.g., source IP address, destination IP address, IP protocol, etc.).

In accordance with various embodiments described herein, network traffic information, such as netflow data, can be collected and utilized within the context of a multi-tenant virtualized computing environment. In this type of environment, a service provider may provide a set of physical resources, such as host computing devices, to its customers and allow the customers to execute their programs using the physical resources of the service provider. As mentioned previously, the resource can be managed by one or more components in a control plane 320, and communications between the hosts and the control plane can be monitored as part of the network flow data. In addition, each host computing device 306 can include a virtualization layer 312 (e.g., a hypervisor in combination with a privileged domain) that hosts one or more guest virtual machines 308, 310. Each virtual machine is owned by a particular customer 302, 304 and can be used to execute a service or application for the customer using the physical resources of the service provider. Each customer can be provided with remote APIs and other management tools to manage their respective virtual machine(s) and the services running thereon.

In accordance with an embodiment, the service provider collects network flow data for each host computing device 306. The network flow data can include at least one record for each defined flow of network packets transmitted by a virtual machine or received by a virtual machine on the host computing device. In one embodiment, the network flow data is collected by an agent that is implemented in the virtualization layer 312 of the host computing device (e.g., in a privileged domain). Once the network flow data 314 is collected, it can be stored in a data structure on the host computing device. In addition, the network flow data can be exported from the host computing device to a network flow collector 316, or flow monitoring component, that is external with respect to the host computing device. The exporting of the network flow data can be performed periodically, or in response to determining that a particular flow has terminated, among other such events. Once exported, the network flow data can be analyzed to detect various misconfigurations of various components, malicious agents that may be attacking the network and the like. The flow data can also be analyzed as discussed herein to determine whether or not the flow falls within an acceptable range, type, and/or category as determined using the current baseline.

In the illustrated embodiment, the host computing device 306 can collect network flow data. Network flow data 314 can include any information related to the internet protocol (IP) traffic being transmitted by or received by the host, virtual machines, and/or customer-provided code operating thereon, such as traffic between hosts or between the hosts and the control plane. In one embodiment, the network flow data includes one or more records, where each record captures information about a flow of packets. The network flow data can be gathered in the state tracking tables and IP tables by an agent on the host computing device 306, as may residing in a virtualization layer in some embodiments. Once the network flow data has been gathered and stored on the host computing device 306, the data can be exported to a network flow collector 316. The network flow collector 316 can be any component external with respect to the host computing device, such as a centralized service executing on the network of the service provider, a remote computing device, and the like. In one embodiment, each time a flow is terminated (e.g., completed, shut down, etc.), the network flow data for the flow is exported out of the host computing device to the network flow collector. In another embodiment, the network flow data for the flows that are still in process of being carried on can be periodically exported (i.e., prior to completion of the flows). In one embodiment, provider specific information (e.g., customer account ID, virtual machine ID, and session termination data) can be added to the network flow data 312 at the time of exporting the network flow data to the network flow collector. In another embodiment, the service provider specific information can be added to the network flow data at the time of capturing the network flow data and storing it on the host computing device.

Once the network flow data has been exported to the network flow collector, it can be analyzed by a network flow analyzer 318. Analyzing the network flow data can include executing one or more queries on the data. The service provider specific information that has been added to the network flow data can be useful in this context, when running the queries. For example, the network flow analyzer may run queries such as "show all entities that this virtual machine has communicated with" or "show all systems that virtual machines belonging to a particular customer have communicated with in a particular time interval". Such an approach enables the system to determine whether the network flow within the system falls within expected ranges, and enables that determination to be made at a more granular level than conventional systems. In at least some embodiments, a snapshot can be take of the current network flow data and that snapshot can be compared to the current baseline. An alarm can be generated if the difference is beyond the allowable deviation from the baseline.

Figure 4:
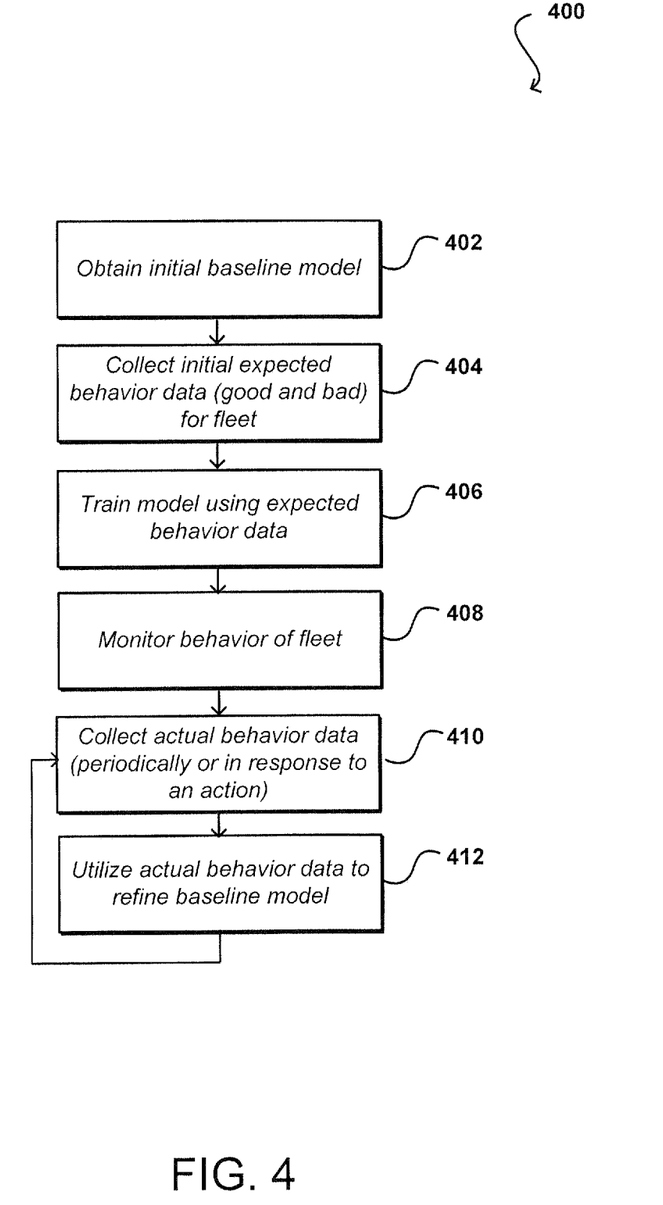
FIG. 4 illustrates an example process for establishing a baseline of behaviors that can be used in accordance with various embodiments.

FIG. 4 illustrates an example process 400 for generating and updating a baseline that can be used in accordance with various embodiments. It should be understood that for this and other processes discussed herein that there can be additional, fewer, or alternative steps performed in similar or alternative orders, or at least partially in parallel, within the scope of the various embodiments unless otherwise stated. In this example, an initial baseline model is obtained 402 for a fleet of machines, although any other appropriate set of resources in an electronic environment can utilize such a model as well within the scope of the various embodiments. The model can comprise any appropriate model for accepting behavior data and generating an indication of whether that behavior is acceptable, or whether the behavior is potentially suspicious and should be monitored to determine whether the rate or prevalence of the behavior matches parameters of acceptable behavior represented by the baseline. The model can accept data such as types of deployments, types of communications, configurations of specific types of resources, and/or any other such information discussed or suggested elsewhere herein. In addition, initial and/or expected behavior data can be collected 404 or otherwise obtained, which can represent behavior that will be expected or acceptable based at least in part upon the initial configuration of the fleet or policies of the fleet provider, among other such options. The behavior data can include both behavior data indicative of expected or acceptable behavior, and behavior data indicative of malicious or unacceptable behavior. The model then can be trained 406 using the expected behavior data.

In order to keep the model up to date, behavior across the fleet can be monitored 408 as discussed herein. Additional behavior data can be collected 410 at appropriate times, such as periodically or in response to detected changes in behavior, among other such options. The additional collected behavior data then can be used to refine 412 the baseline model, such as to generate new coefficients, determine new acceptable configurations or deployments, update acceptable communication behavior information, and the like.

Figure 5:
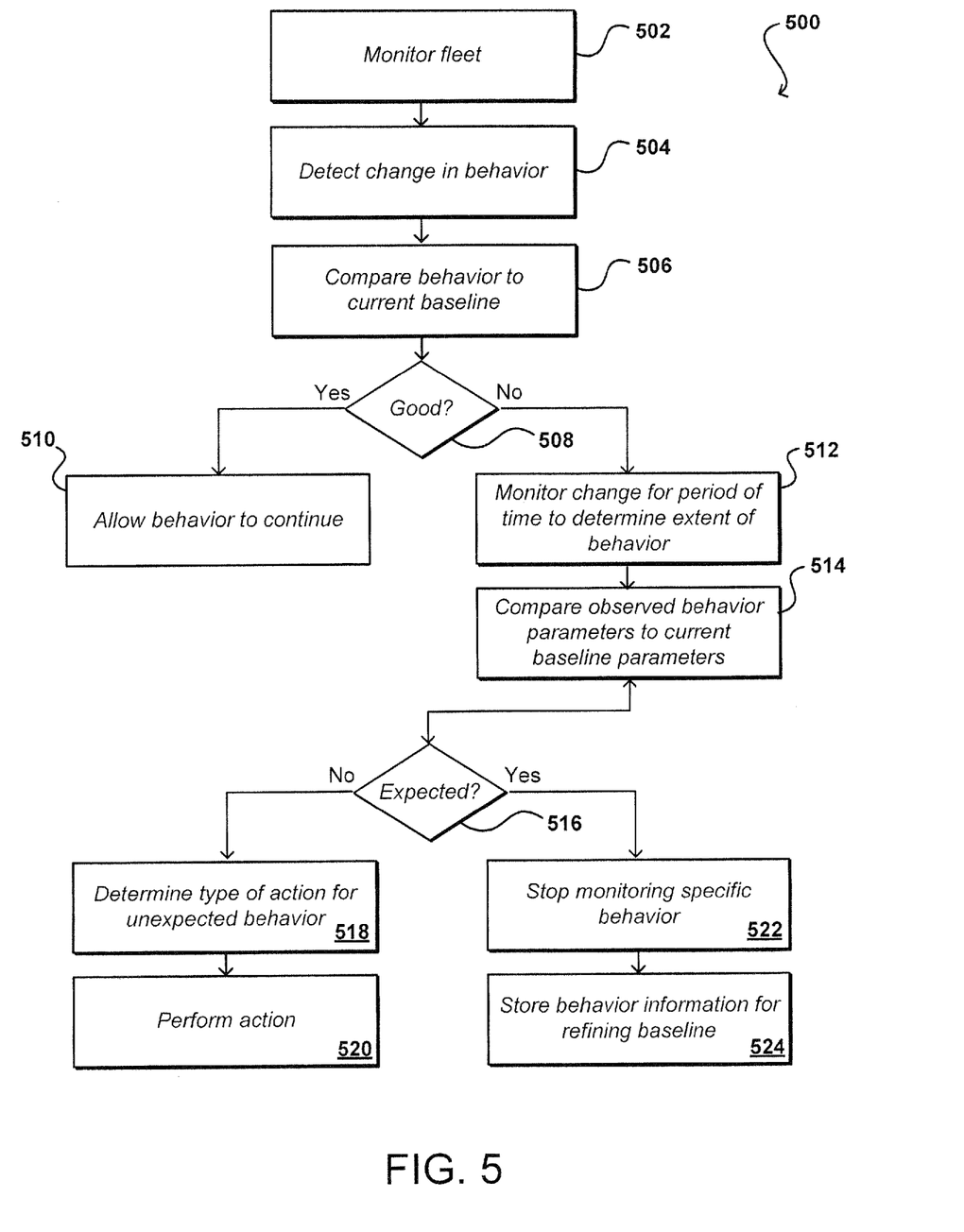
FIG. 5 illustrates an example process for determining whether an observed behavior matches a determined baseline in accordance with various embodiments.

FIG. 5 illustrates an example process 500 for using such a baseline or baseline model to determine whether observed behavior is acceptable or expected behavior in accordance with various embodiments. In this example, a fleet of machines (or other such grouping of electronic resources) is monitored 502 as discussed or suggested herein. During the monitoring, a change in behavior, or new behavior, can be detected 504. As discussed, this can include various types of behavior, such as deployment or installation of software packages, configuration of various resources, communication among the various resources, and the like. Information for the behavior can be compared 506 against the baseline to determine if the behavior is listed as a "good" or otherwise acceptable or expected behavior. If it is determined 508 to be a good behavior, the behavior can be allowed 510 to continue and information for the behavior can be used to update the baseline as appropriate.

If the behavior not indicated to be an acceptable behavior according to the baseline, for example, that detected behavior can be monitored 512 for at least a period of time to attempt to determine the extent, rate, and/or prevalence of the behavior. For example, a deployment or change in configuration can be monitored to attempt to determine the rate and/or pattern of the change, as well as the number of resources likely to be affected by the change. After a sufficient time and/or amount of data has been collected, the parameters (e.g., rate or prevalence) of the observed behavior data can be compared 514 against parameters for acceptable behavior according to the current baseline. If the parameter values are determined 516 to fall outside the range or bounds of accepted behavior parameter values, an appropriate action (e.g., alarm, notification, process termination, etc.) for the behavior can be determined 518 and performed 520 as appropriate. If the parameter values of the observed behavior are determined to be within the rage or bounds of acceptable behavior, the monitoring of that specific behavior can be stopped 522. In at least some cases, data for that behavior can be stored 524 and/or utilized to refine the baseline model for current network conditions. For example, information for the type of behavior can be added to the baseline as a good or acceptable behavior.

Figure 6:
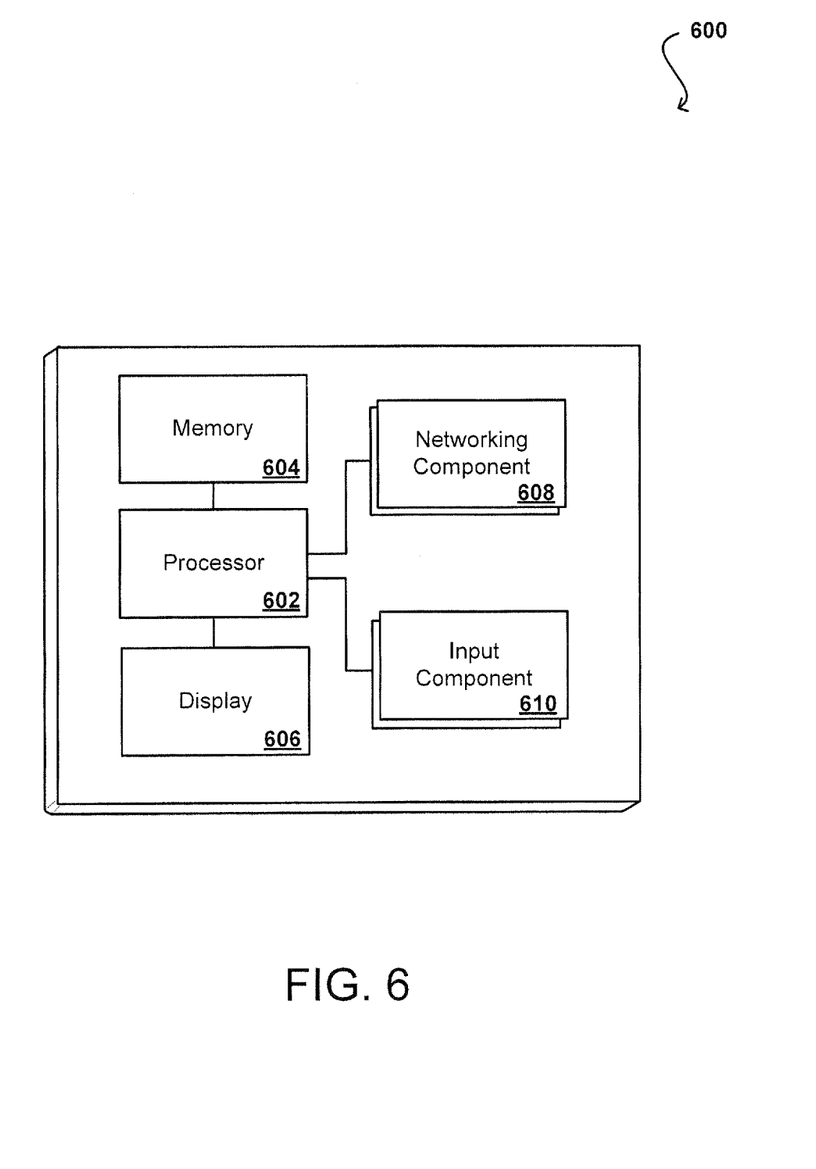
FIG. 6 illustrates a configuration of components of an example computing device that can be used in accordance with various embodiments.

FIG. 6 illustrates an example set of basic components of a computing device 600, such as the device 100 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device in some embodiments will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device can include one or more networking components 608 enabling the computing device to communicate over one or more networks, whether wired and/or wireless. The example device can also include at least one additional input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for providing access to at least one host machine in a multi-tenant environment, comprising:
   a plurality of host machines, each host machine including at least one processor and memory for storing instructions executable by the at least one processor;
   at least one interface component enabling a user device to obtain access to at least one of the plurality of host machines; and
   a monitoring component in communication with the plurality of host machines, the monitoring component configured to:
      detect a change with respect to at least one of the host machines;
      compare information for the change to a behavior baseline to determine whether the change matches an expected behavior;
      monitor related changes for at least a period of time, when the change does not match an expected behavior, to determine a rate or a prevalence of a type of the change;
      compare information for the rate or prevalence to at least one corresponding parameter value for baseline to determine whether the rate or prevalence falls within an expected parameter value range;
      automatically add behavior information for the change to the baseline in response to the rate or prevalence falling within the expected parameter value range; and
      generate a notification when the rate or prevalence falls outside the expected parameter value range,
      wherein the expected behavior is one of a plurality of expected behaviors, at least a portion of the expected behaviors being determined based at least in part upon data for purposeful behaviors observed within the plurality of host machines, and
      wherein at least a portion of the purposeful behaviors are specified by at least one user associated with the plurality of host machines.

2. The system of claim 1, further comprising:
   a management component configured to collect the information for the rate or prevalence and update the expected parameter range using the information.

3. The system of claim 1, wherein the change includes at least one of a change in software, a change in configuration, or a change in communication flow.

4. The system of claim 1, wherein the prevalence includes at least one of a number, a percentage, or a type of host machine to which the change occurs.

5. A computer-implemented method, comprising:
   detecting a change in behavior affecting at least one resource in a plurality of electronic resources;
   comparing information for the change in behavior to a behavior baseline, the behavior baseline reflecting acceptable behaviors for a substantially current state of the plurality of electronic resources;
   detecting related changes reflecting a prevalence of the change in behavior for at least a portion of the plurality of electronic resources;
   determining whether the prevalence falls within parameter value ranges for one or more acceptable behaviors of the behavior baseline; and
   adding information for the change in behavior to the behavior baseline when the prevalence falls within the parameter value ranges for the one or more acceptable behaviors,
   wherein at least a portion of the acceptable behaviors are based at least in part upon data for purposeful behaviors observed within the plurality of electronic resources, at least a portion of the purposeful behaviors specified by at least one user associated with the plurality of electronic resources.

6. The computer-implemented method of claim 5, further comprising:
   determining a type of the change in behavior, wherein the type of the change in behavior is selected from a group of behaviors includes at least one of a change in software version, a deployment of a new software package, a change in device configuration, a change in software configuration, a change in observed control plane traffic, a change in network data flow, a change in communication pattern, or a new communication pattern.

7. The computer-implemented method of claim 5, further comprising:
performing an action when the prevalence falls outside the parameter value ranges.

8. The computer-implemented method of claim 7, wherein the action includes at least one of generating a notification for at least one user associated with the plurality of electronic resources, generating an alarm, throttling communication between two or more of the resources, or suspending operation of at least one operation on at least one of the resources.

9. The computer-implemented method of claim 7, wherein the prevalence includes at least one of a rate of occurrence of the behavior, a number of occurrences of the behavior, a type of electronic resource exhibiting the behavior, or a frequency of occurrences of the behavior.

10. The computer-implemented method of claim 5, wherein at least a portion of the purposeful behaviors are determined based at least in part upon a pervasiveness of behaviors among the plurality of electronic resources.

11. The computer-implemented method of claim 5, further comprising:
computing a velocity for the change in behavior, wherein the prevalence of the change in behavior falling outside the parameter value ranges for the one or more acceptable behaviors corresponds to the velocity for the change deviating by more than an allowable amount with respect for an average velocity for a type of the change as determined using the behavior baseline.

12. The computer-implemented method of claim 5, further comprising:
receiving information for the change affecting the at least one resource from an activity monitor operating on at least one of the at least one resource.

13. The computer-implemented method of claim 5, further comprising:
determining that a minimum percentage of the plurality of resources exhibits the change in behavior before updating the behavior baseline.

14. The computer-implemented method of claim 5, further comprising:
generating the behavior baseline by training a baseline model using initial behavior data and observed behavior data from the plurality of resources.

15. A system, comprising:
a processor; and
a memory device including instructions that, when executed by the processor, cause the processor to:
monitor behavior of a plurality of electronic resources;
detect a change in behavior affecting at least one resource in the plurality of electronic resources;
determine whether the change in behavior is an acceptable behavior according to a behavior baseline;
if the change in behavior is not indicated as an acceptable behavior according to the behavior baseline:
determine a rate of related changes in behavior for at least a portion of the plurality of electronic resources;
compare information for the rate of related changes in behavior to parameter values for acceptable behaviors of the behavior baseline; and
automatically add information for the change in behavior to the baseline as corresponding to an acceptable behavior in response to the rate of related changes in behavior falling within acceptable parameter value ranges for one or more acceptable behaviors of the behavior baseline,
wherein the acceptable behavior is one of a plurality of acceptable behaviors, at least a portion of the acceptable behaviors being determined based at least in part upon data for purposeful behaviors observed within the plurality of electronic resources, at least a portion of the purposeful behaviors specified by at least one user associated with the plurality of electronic resources.

16. The system of claim 15, wherein the instructions when executed further cause the processor to:
perform an action when the rate of related changes in behavior falls outside the acceptable parameter value ranges.

17. The system of claim 16, wherein the instructions when executed further cause the processor to:
determine a type of the change in behavior; and
determine the action to perform based at least in part upon the type of the change in behavior.

18. The system of claim 15, further comprising:
at least one monitoring component configured to monitor the behavior of a plurality of electronic resources.

19. The system of claim 15, further comprising:
at least one baseline determining component configured to automatically update the behavior baseline.

20. A non-transitory computer-readable storage medium storing instructions that, when executed by at least one processor of a computer system, cause the computer system to:
detect a change affecting at least one resource in a plurality of electronic resources;
determine whether the change in behavior is an acceptable behavior according to a behavior baseline;
if the change in behavior is not indicated as an acceptable behavior according to the behavior baseline:
determine a prevalence of related changes in behavior for at least a portion of the plurality of electronic resources;
compare information for the prevalence of related changes in behavior to parameter values for acceptable behaviors of the behavior baseline; and
automatically add information for the change in behavior to the baseline as corresponding to an acceptable behavior in response to the prevalence of related changes in behavior falling within an acceptable parameter value range for one or more acceptable behaviors of the behavior baseline,
wherein the acceptable behavior is one of a plurality of acceptable behaviors, at least a portion of the acceptable behaviors being determined based at least in part upon data for purposeful behaviors observed within the plurality of electronic resources, at least a portion of the purposeful behaviors specified by at least one user associated with the plurality of electronic resources.

21. The non-transitory computer-readable storage medium of claim 20, wherein the prevalence includes at least one of a rate of occurrence of the behavior, a number of occurrences of the behavior, a type of electronic resource exhibiting the behavior, or a frequency of occurrences of the behavior.

22. The non-transitory computer-readable storage medium of claim 20, wherein the action includes at least one of generating a notification for at least one user associated with the plurality of electronic resources, generating an alarm, throttling communication between two or more of the resources, or suspending operation of at least one operation on at least one of the resources.

* * * * *